United States Patent Office 3,446,097
Patented May 27, 1969

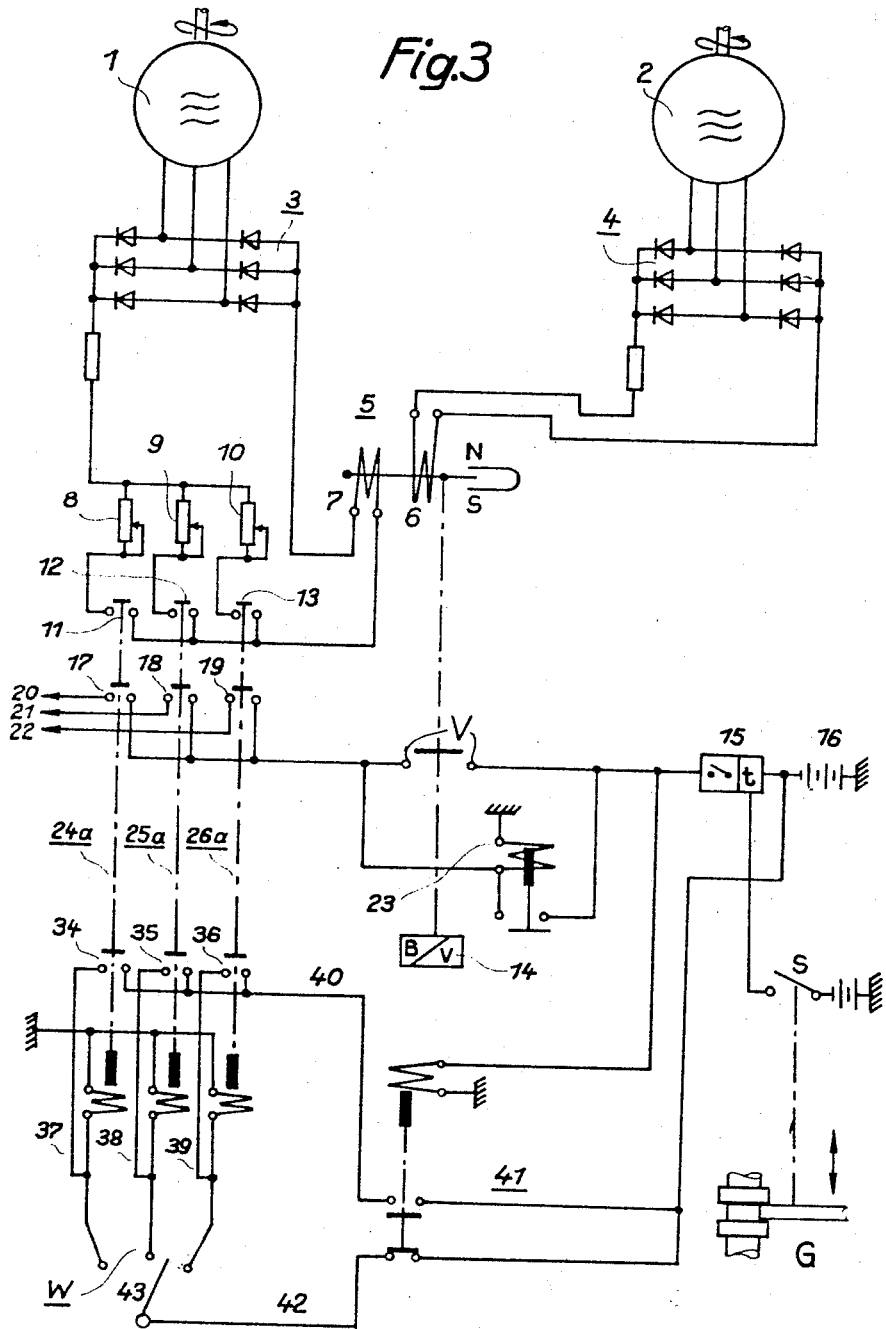

3,446,097
DEVICE FOR THE SYNCHRONIZED SHIFTING OF MOTOR VEHICLE TRANSMISSIONS
Karl Heinz Schmidt, Kreis Hersbruck, Vorra, and Benno Bildat, Erlangen, Germany, assignors to Karl Heinz Schmidt, Kreis Hersbruck, Vorra, Germany
Continuation-in-part of application Ser. No. 497,399, Oct. 18, 1965. This application Apr. 11, 1968, Ser. No. 720,706
Claims priority, application Germany, Apr. 14, 1967, Sch 40,548
Int. Cl. F16h 5/40, 5/74, 9/00
U.S. Cl. 74—844                              7 Claims

ABSTRACT OF THE DISCLOSURE

A gear shifting system for a variable speed gear box transmission having electric generators connected to be driven by the input and output shafts of the gear box to provide electrical quantities responsive to the speeds of these respective shafts. A coupling for momentarily uncoupling the engine drive shaft and the gear box input shaft while the gears are shifted into neutral preparatory to shifting to a preselected gear ratio. Circuit elements having electrical characteristic quantities relatively proportional to the selectable gear ratios of the gear box and connected by a preselector to the input and output shaft generators and an electrical comparing device such that when the gears to be engaged to provide the desired ratio are in synchronism a gear shifting motor is energized to effect the selected engagement without uncoupling the gear box input and engine shafts. A holding or locking device maintains the gear shifting motor energization once it has been established until the preselected gears are fully engaged.

---

Figure 1:
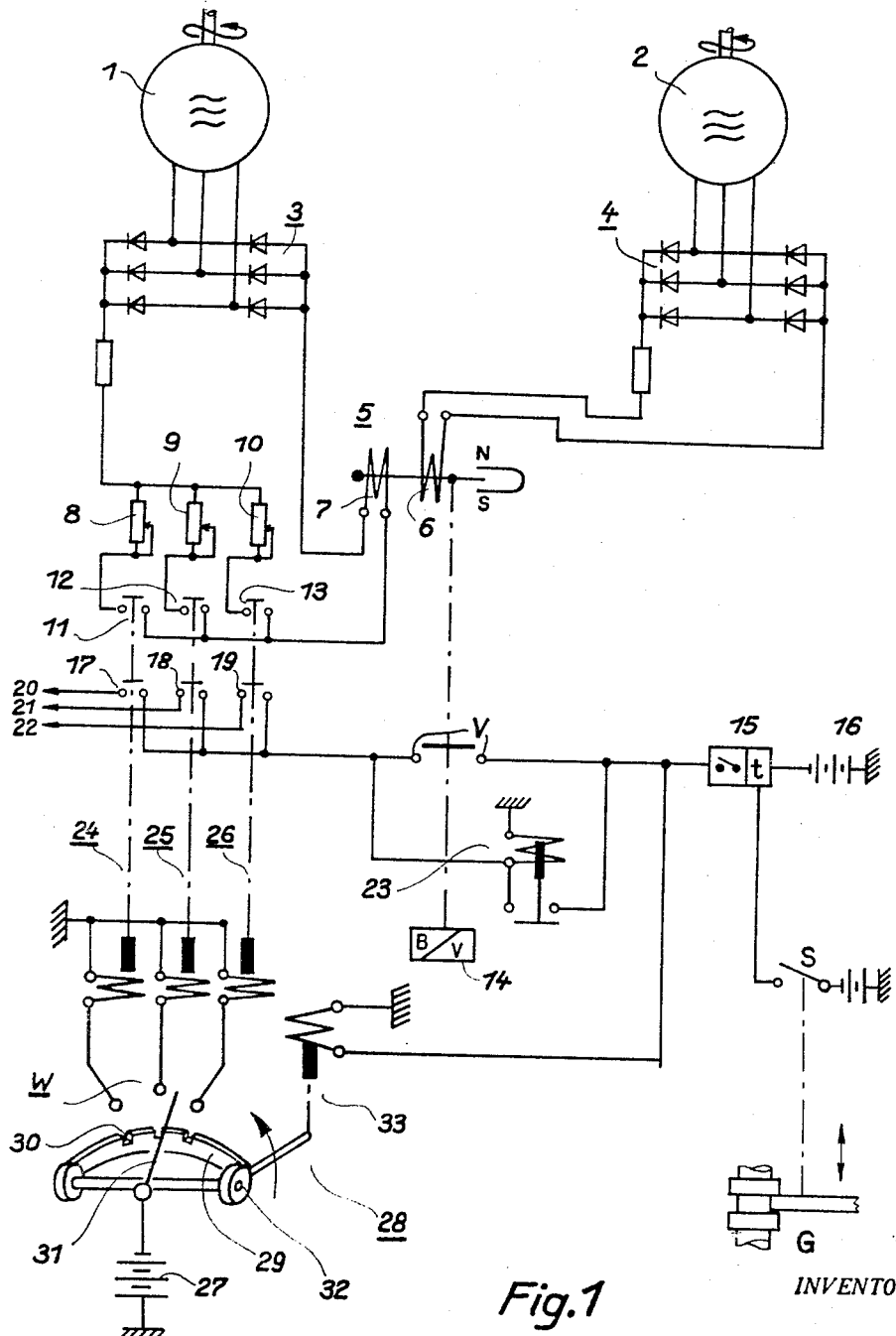

This is a continuation-in-part of copending application Ser. No. 497,399, filed Oct. 18, 1965, which relates to a device for the synchronized shifting of motor vehicle transmissions where electric quantities generated by generators coupled with the driving shaft of the transmission and with the driven shaft of the transmission, and representing the speed of the gear shaft on the input and output side, respectively, with interposition of electric circuit elements corresponding to the shiftable gears to be preselected, are supplied to a comparator circuit which, upon occurrence of the quantity ratio indicating synchronism of the transmission members to be coupled, furnishes an electric signal for energizing a gear shift motor to effect the engagement of the selected gears. The comparator circuit also preferably is provided with a signal transformer which prolongs the signal indicating synchronism of the transmission members to be coupled for a period of time which is adapted to the response time of the gearshift motor effecting the engagement of the selected gear without interruption of the connection between transmission and drive motor during the gear shifting engagement.

According to a preferred form of construction of this shifting device in the parent patent application, the switching on of the circuit elements assigned to the shiftable gears and the transmission of said signal indicating synchronism of the selected gears to be engaged, the gearshift motor is controlled by a number of relays with contact pairs fulfilling said two functions. These relays can be energized selectively by the driver by actuation of a selector switch.

Now, if the selector switch is actuated by the driver during a gear shifting operation in the shifting device in the parent application, a new circuit element corresponding to the then selected gear ratio is always connected to the comparator circuit, so that a comparison of the electric quantities takes place which corresponds to the newly selected gear ratio, even though the comparison initiated before by the preceding shift condition may not yet have been completed.

Thereby a long interruption of the driving connection between the drive motor and the vehicle wheels to be driven may be caused, which on downgrades results in an unwanted and dangerous acceleration of the vehicle and on upgrades in a sharp reduction of the vehicle speed.

By the present invention, the problem solved is to prevent, in shifting devices of the kind described in the parent application, the driver of the vehicle in question from making another gear preselection before a preceding gear shifting operation has been completed.

In accordance with the present invention, the shifting device is characterized by a selector switch for the selective energization of relays effecting both the switching on of the circuit elements assigned to the shiftable gears, as well as the transmission of the signal indicating synchronism to corresponding inputs of the gear-shift motor, which (selector switch) cooperates with a locking device which maintains the energization of a specific relay selected by the selector switch for the duration of said shifting operation.

Figure 2:
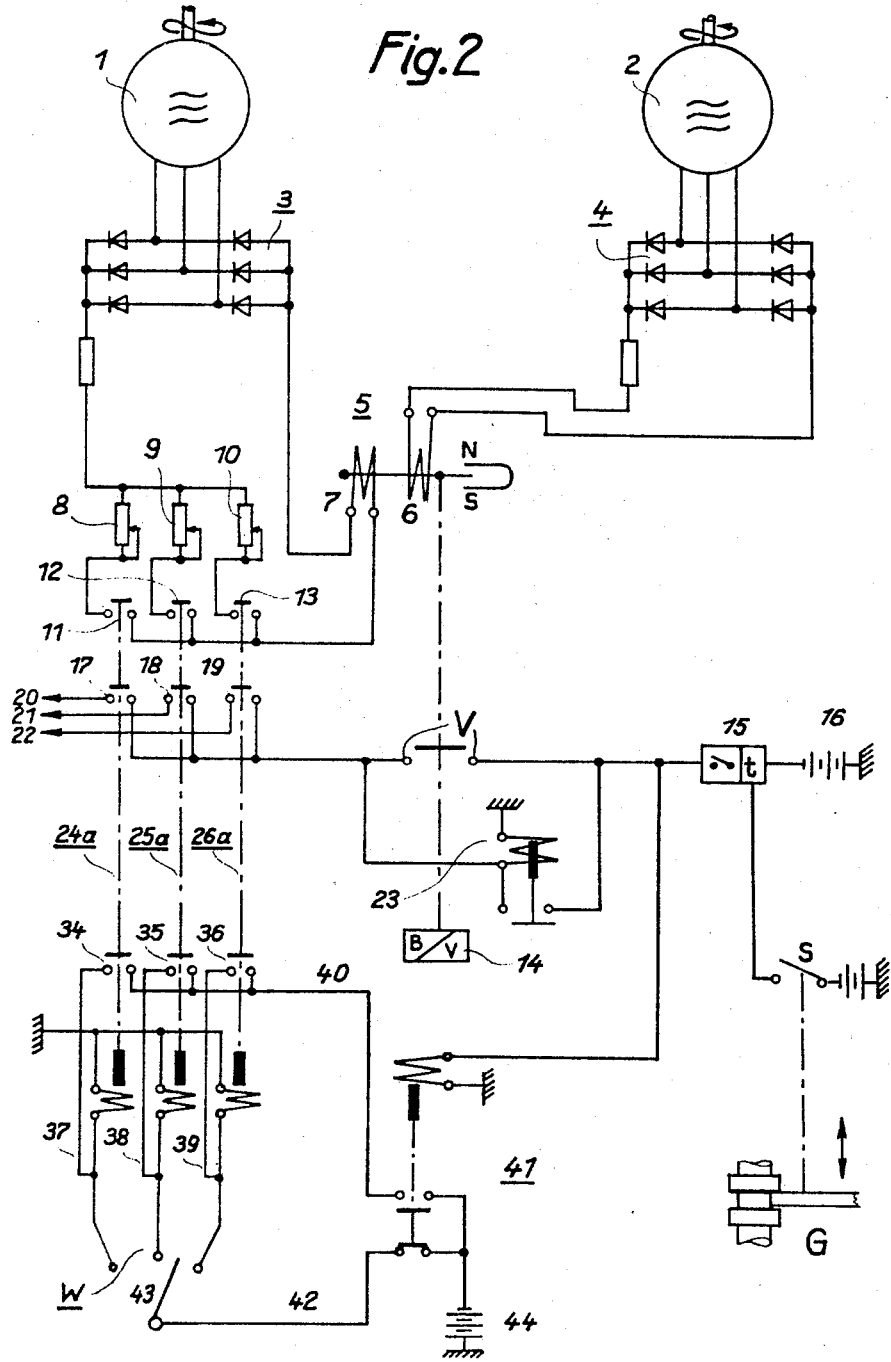

The invention is explained further in the following by the description, given as example, of some preferred forms of construction and circuitry with reference to the annexed drawings, in which:

FIG. 1 represents the circuit diagram of a shifting device according to this invention having a selector switch with a mechanical-electrical locking device, and FIGS. 2 and 3 are circuit diagrams of shifting devices according to the invention with electric locking devices in different circuit arrangements.

In the drawings, mutually corresponding circuit parts are marked with the same reference symbols.

Referring to the drawings, the shifting device, according to the invention, comprises a three-phase A-C generator 1 rigidly coupled with the driving shaft of the motor vehicle transmission and a three-phase A-C generator 2 likewise rigidly coupled with the driven shaft of the motor vehicle transmission. The output currents of these generators are rectified through two-way rectifier circuits 3, 4 and are then supplied to two inputs of a comparator circuit which, in the present embodiment of the invention, has the form of a polarized relay 5. The output of the rectifier circuit 4 is connected directly to a control winding 6 of the polarized relay 5, while the output of the rectifier circuit 3 is connected to a control winding 7 of the polarized relay selectively via resistances 8, 9, or 10, whose resistance values are characteristic quantities corresponding to the connectable transmission ratios of the motor vehicle gear transmission. These resistances are connected into the circuit containing the control winding 7 selectively through relay contacts 11, 12, and 13.

The armature of the polarized relay is equipped with contacts V, which are closed when the control windings 6 and 7 are energized equally strongly, which occurs when the transmission members to be coupled are in synchronism.

In addition, there may be connected with the armature of the polarized relay 5 a device indicated at 14 as a block symbol which, depending on the position of the polarized relay representing the particular speed ratio of the transmission members to be coupled, brings about either a motor acceleration by increased fuel supply or a motor braking, for example, by operation of a motor brake. Such a device has been proposed already elsewhere.

The contacts V are connected, one to a current source 16 via a delayed action relay 15, and the other via contacts 17, 18, and 19 actuated simultaneously with the relay contacts 11, 12, and 13, with signal lines 20, 21, and 22. These latter lines lead to corresponding inputs of a gearshift motor, so that during the energization condition of relay 15 a voltage is applied to the input of the gear-shift motor selected by closing of one set of contacts 17, 18, or 19 when the contacts V are closed by the occurrence of synchronism of the transmission gears to be coupled.

This energization, resulting from the closing of the contacts V and triggering the engagement of the selected gear via the signal lines 20, 21, or 22, is prolonged by means of a signal transformer to a duration adapted to the response time of the gear shifting motor. Such a signal transformer is formed in the shifting device according to the invention by the relay 15 in connection with a holding relay 23 bridging the contacts V, said holding relay being energized as soon as the contacts V are closed. Deenergization of relay 23 does not occur until the relay 15 trips and disconnects the current source 16.

Relay 15 is tripped by closing a switch S, which supplies a triggering pulse to relay 15 when the transmission has been placed in idling position. This operative connection is indicated in the drawings at G.

The part of the shifting device of the invention described hereinabove is common to the examples of construction illustrated in FIGS. 1 to 3.

It can be seen from FIG. 1 that the contacts 11 and 17, or 12 and 18, or 13 and 19, form contact sets respectively of relays 24, or 25, or 26, which are energizable selectively through a selector switch W by connection with a current source 27.

To prevent actuation of switch W for the selection of another transmission gear ratio before a gear shifting operation has been completed, a locking device, generally marked with the reference number 28 in FIG. 1, is provided. This locking device acts on the selector switch W and blocks the same in a position once set for the duration of a gear shifting operation, that is, in the present case, during the connected time of relay 15. The locking device 28 has the form of a link 29 with slots 30 corresponding to the adjustable positions of the selector arm 31 of switch W. Link 29 is, as indicated at 32, mounted pivotably and coupled with a solenoid 33, which in turn is energized from the output of relay 15.

Attainment of the neutral position in the transmission, therefore, leads to a closing of switch S and to a release of the delayed-action relay 15, and also to a pivoting of link 29 in cooperation with arm 31 of the selector switch W, so that the latter is retained in the position which the driver had set before adjustment of the transmission to the neutral position. The energy for the actuation of link 29 can, of course, be derived from another current source than battery 16, the feeding of energy occurring possibly through additional contacts of relay 15.

In FIG. 2, the relays, the contact sets of which contain the contacts 11 and 17, 12 and 18, and 13 and 19, are designated by 24a, 25a, and 26a. These relays have additional contacts 34, 35, and 36, which form a part of holding circuits 37, 38, and 39 connected to the relay windings. From the contacts 34, 35, and 36, said holding circuits are connected via a common line 40 to a reversing switch 41, while a line 42 leads from the arm 43 of a switch W serving for the selective energization of the relays 24a, 25a, and 26a likewise to the reversing switch 41.

Through the reversing switch 41 a current source 44 is connectable either to arm 43 of the selector switch or via line 40 to the holding circuits 34, 35, and 36. Similarly to the energization of the solenoid 33 for the actuation of the locking device 28 of the previously described embodiment of the invention shown in FIG. 1, and in the FIG. 2 embodiment, the energization of the reversing switch 41 occurs over a period which corresponds to the duration of one gear shifting operation. This is achieved in the FIG. 2 system, in that the energization of a relay forming the reversing switch 41 occurs when the relay 15 is closed.

FIG. 3 of the drawings shows a locking device similar to that of FIG. 2, but here the energization of the relays 24a, 25a, and 26a is effected from the battery 16 rather than a separate current source. The energizing winding of relay 41 forming the reversing switch is again connected to the output of the delayed-action relay 15.

Concerning the operation of the locking devices according to FIGS. 2 and 3, it should be noted that when the shifting device is in a set condition in which the motor vehicle is driven steadily through a certain transmission gear, the delayed-action relay 15 is unenergized and also the reversing switch 41 is therefore in the unenergized state shown in the drawings. In this state, a direct connection exists from the current source 44 or from the battery 16 to the arm 43 of the selector switch W, so that when the selector switch is set in a certain new shift position, the relay 24a, 25a, or 26a assigned to the selected position, is immediately energized and the shifting of the preselected gear proceeds as has been described.

When now the actual gear shifting operation is initiated by the fact that the previously engaged gear is disengaged, that is, the transmission is brought into the neutral position, then relay 15 is energized through the switch S, whereby also a conductive connection is established between the battery 16 and the reversing switch 41, the latter being energized thereby. The reversing switch 41 now changes over to its other shift position and open-circuits arm 43 of the selector switch W from the current source 44 or battery 16, so that now a displacement of the selector switch remains without effect. The energization of the selected relay, however, is maintained after actuation of the reversing switch 41 via the auxiliary contacts 34 or 35 or 36 and via line 40.

Compared with the mechanical locking device according to the invention as per FIG. 1 of the drawings, the locking devices according to FIGS. 2 and 3 of the drawings have the further advantage that the driver can, immediately after initiation of a shifting operation, displace the selector switch in the sense of a new shift command which, however, is executed only when the shifting operation just released has been completed.

What is claimed is:

1. Electric control means for synchronized gear shifting in a variable speed gear box for a vehicle driven by a motor comprising a gear box having gear members, a driving input shaft and a driven output shaft, means including a driving coupling for connecting said driving input shaft to a driving motor shaft, gear shifting means, means for controlling operation of said gear shifting means to neutral position of said gear members, means for generating a first electric quantity representing the speed of said driving shaft of the gear box, means for generating a second electric quantity representing the speed of said driven shaft of the gear box, means for comparing said first and second electric quantities derived from said generating means, a plurality of selectably interconnectable circuit elements connected between one of said generating means and said comparing means, each of said circuit elements having an electrical characteristic quantity of a magnitude corresponding to a particular transmission ratio, said comparing means providing a signal whenever synchronism of the gear members selected to be coupled is established, means for activating said gear shifting means in response to said signal for engaging the respective selected gear members without disengaging the driving coupling between the driving motor and said driving shaft of the gear box, pulse transforming means connected to said comparing means for extending the length of said signal to a period corresponding to the inherent activation time of said gear shifting means, a plurality of relay means each of which corresponds to one of said plurality of circuit elements and serves for connection of the respective one of said circuit elements between said comparing means and said one of said generating means as well as for connection of said pulse transforming means to said activating means for energizing the same by said signal, selector switch means for selectably energizing one of said plurality of relay means, and locking means for maintaining energization of a selected one of said plurality of relay means during each gear shifting operation.

2. Electric control means in accordance with claim 1, in which said locking means comprises a catch having notches corresponding to the selectable positions of said selector switch means, said catch being automatically operated for being held, during each gear shifting operation, in a position in which said selector switch means is locked in its respective selected position by one of said notches.

3. Electric control means in accordance with claim 1, in which said locking means comprises two-position switch means being automatically switched over from a first position to a second position during each gear shifting operation, a power source being provided which is connected via said two-position switch means in said first position thereof to said selector switch means for initial energization of a particular one of said plurality of relay means, each of said plurality of relay means having holding contacts for maintaining energization thereof after an initial energization, said power source being connected to said holding contacts via said two-position switch means in said second position thereof, while the connection between said power source and said selector switch means is interrupted in said second position of said two-position switch means so that energization of a selected one of said plurality of relay means is maintained during the gear shifting operation irrespective of an alteration of the position of said selector switch means.

4. Electric control means in accordance with claim 1, in which said locking means comprises a catch having notches corresponding to the selectable positions of said selector switch means and electromagnetic actuator means for automatically operating said catch so that it is held during each gear shifting operation in a position in which said selector switch means is locked in its respective position by one of said notches.

5. Electric control means in accordance with claim 1, in which said locking means comprises two-position switch means and electromagnetic actuator means for automatically switching over said two-position switch means from a first position to a second position during each gear shifting operation, a power source being provided which is connected via said two-position switch means in said first position thereof to said selector switch means for initial energization of a particular one of said plurality of relay means, each of said plurality of relay means having holding contacts for maintaining energization thereof after an initial energization, said power source being connected to said holding contacts via said two-position switch means in said second position thereof, while the connection between said power source and said selected switch means is interrupted in said second position of said two-position switch means so that energization of a selected one of said plurality of relay means is maintained during the gear shifting operation irrespective of an alteration of the position of said selector switch means.

6. Electric control means in accordance with claim 1, in which said pulse transforming means comprises a holding relay with a set of holding contacts and delay relay switch means being energizable into "on"-condition for a predetermined period under control of the operator, said holding relay being connected to said activating means for energization thereof and in turn being energized initially by said signal of said comparing means whereafter energization of said holding relay is maintained via said set of holding contacts and via said delay relay switch means for said predetermined period, and in which said locking means comprises a two-position switch means being part of said delay relay switch means and being switched over from a first position to a second position during said predetermined period, a power source being provided which is connected via said two-position switch means in said first position thereof to said selector switch means for initially energizing of a partcular one of said plurality of relay means, each of said plurality of relay means having holding contacts for maintaining energization thereof after an initial energization, said power source being connected to said holding contacts via said two-position switch means in said second position thereof, while the connection between said power source and said selector switch means is interrupted in said second position of said two-position switch means so that energization of a selected one of said plurality of relay means is maintained during said preselected period irrespective of an alteration of the position of said selector switch means.

7. Electric control means in accordance with claim 1, in which said pulse transforming means comprises a holding relay with a set of holding contacts and delay relay switch means being energizable into "on"-condition for a predetermined period under control of the operator, said holding relay being connected to said activating means for energization thereof and in turn being energized initially by said signal of said comparing means where after energization of said holding relay is maintained via said set of holding contacts and via said delay relay switch means for said predetermined period and in which said locking means comprises a catch having notches corresponding to the selectable positions of said selector switch means and electromagnetic actuator means for holding said catch during said predetermined period, in a position in which said selector switch means is locked in its respective selected position by one of said notches, said electromagnetic actuator means being connected to said delay relay switch means for being energized during said predetermined period.

References Cited

UNITED STATES PATENTS

| | | | |
|---|---|---|---|
| 3,077,121 | 2/1963 | Schaub | 74—861 |
| 3,103,826 | 9/1963 | Jaeschke | 74—339 |
| 3,329,038 | 7/1967 | Peras | 74—858 |
| 3,335,830 | 8/1967 | De Castelet | 74—858 |
| 3,364,795 | 1/1968 | De Castelet | 74—858 |

DONLEY J. STOCKING, *Primary Examiner.*

H. S. LAYTON, *Assistant Examiner.*

U.S. Cl. X.R.

74—334, 339, 858, 866; 192—92